(12) United States Patent
Prendergast

(10) Patent No.: US 8,239,971 B2
(45) Date of Patent: Aug. 14, 2012

(54) CARRIAGE AND SOCKET ASSEMBLY FOR A NIGHT VISION GOGGLE MOUNT

(75) Inventor: Jonathon R. Prendergast, Newport Beach, CA (US)

(73) Assignee: Norotos, Inc., Santa Ana, CA (US)

( * ) Notice: Subject to any disclaimer, the term of this patent is extended or adjusted under 35 U.S.C. 154(b) by 17 days.

(21) Appl. No.: 12/398,864

(22) Filed: Mar. 5, 2009

(65) Prior Publication Data
US 2009/0268288 A1 Oct. 29, 2009

Related U.S. Application Data

(60) Provisional application No. 61/034,127, filed on Mar. 5, 2008.

(51) Int. Cl.
*A42B 1/24* (2006.01)
(52) U.S. Cl. ........................... 2/422; 248/220.21
(58) Field of Classification Search ............ 248/220.21, 248/223.41, 224.51, 224.61, 551; 2/6.1, 2/6.2, 6.3, 6.6, 9, 410, 422, 424; 359/418; 224/181
See application file for complete search history.

(56) References Cited

U.S. PATENT DOCUMENTS

| | | | |
|---|---|---|---|
| 1,226,101 A | 5/1917 | Marsden | |
| 2,284,180 A | 5/1942 | Thomas | |
| 3,243,153 A * | 3/1966 | Kelly et al. | 248/231.21 |
| 4,449,787 A | 5/1984 | Burbo et al. | |
| 4,553,873 A | 11/1985 | Salice | |
| 4,689,834 A | 9/1987 | McCarthy et al. | |
| 4,697,783 A | 10/1987 | Kastendieck et al. | |
| 4,987,608 A | 1/1991 | Cobb | |
| 5,176,342 A | 1/1993 | Schmidt et al. | |
| 5,179,735 A | 1/1993 | Thomanek | |
| 5,226,181 A | 7/1993 | Polednak et al. | |
| 5,307,204 A | 4/1994 | Dor | |
| 5,331,684 A | 7/1994 | Baril et al. | |
| 5,339,464 A * | 8/1994 | Dor | 2/6.2 |
| 5,347,119 A | 9/1994 | Connors | |
| 5,408,086 A | 4/1995 | Morris et al. | |
| 5,467,479 A | 11/1995 | Mattes | |
| 5,469,578 A | 11/1995 | Mattes | |
| 5,471,678 A | 12/1995 | Dor | |
| 5,506,730 A * | 4/1996 | Morley et al. | 359/815 |
| 5,542,627 A | 8/1996 | Crenshaw et al. | |
| 5,581,806 A | 12/1996 | Capdepuy et al. | |
| 5,648,862 A | 7/1997 | Owen | |
| 5,703,354 A | 12/1997 | Wannagot et al. | |
| 5,786,932 A | 7/1998 | Pniel | |
| 5,820,091 A * | 10/1998 | Kutscher | 248/220.21 |
| 5,914,816 A | 6/1999 | Soto et al. | |
| D449,411 S | 10/2001 | Largeot | |

(Continued)

OTHER PUBLICATIONS

International Search Report and Written Opinion, Int. Application No. PCT/US08/82163 dated Jan. 15, 2009.

*Primary Examiner* — Nkeisha Smith
(74) *Attorney, Agent, or Firm* — Christie, Parker & Hale, LLP

(57) ABSTRACT

A carriage for a headgear mount including a base having a top surface and a bottom surface, the carriage attachable to the headgear mount. At least one rail extends from the bottom surface, the rail adapted to receive night vision goggles and the rail being integral with the base.

18 Claims, 9 Drawing Sheets

U.S. PATENT DOCUMENTS

| | | |
|---|---|---|
| 6,457,179 B1 | 10/2002 | Prendergast |
| 6,472,776 B1 | 10/2002 | Soto et al. |
| 6,667,832 B2 | 12/2003 | Caplan et al. |
| 6,751,810 B1 | 6/2004 | Prendergast |
| 6,938,276 B1 | 9/2005 | Prendergast |
| 6,957,449 B2 * | 10/2005 | Prendergast ............... 2/422 |
| 7,219,370 B1 | 5/2007 | Teetzel et al. |
| 7,418,738 B2 * | 9/2008 | Prendergast ............... 2/22 |
| 2002/0120979 A1 | 9/2002 | Prendergast |
| 2006/0174401 A1 * | 8/2006 | Prendergast ............... 2/422 |
| 2007/0012830 A1 * | 1/2007 | Prendergast ............... 248/200 |

* cited by examiner

CARRIAGE AND SOCKET ASSEMBLY FOR A NIGHT VISION GOGGLE MOUNT

CROSS-REFERENCE TO RELATED APPLICATIONS

This application claims priority to and the benefit of U.S. Provisional Application No. 61/034,127, filed in the United States Patent and Trademark Office on Mar. 5, 2008, the entire content of which is incorporated herein by reference.

BACKGROUND

Night vision goggles are often removably attached to a user's headgear via a headgear mount so that the night vision goggles can be stowed and/or carried easily when they are not being used. More specifically, a night vision goggle attachment portion may be attached to a socket assembly that can then be coupled to the headgear mount to attach the night vision goggles to the headgear. However, conventional headgear mounts may not provide for smooth and infinite fore/aft adjustment of the night vision goggles once they are attached to the headgear mount and therefore may force a user to locate the goggles at an eye relief distance that is not natural or comfortable. Moreover, different types of night vision goggles often include different night vision goggle attachment portions, thereby requiring a corresponding socket assembly in order to couple the night vision goggles to a headgear mount. Accordingly, there is a need for a headgear mount adapted to receive one of a variety of interchangeable socket assemblies, as well as a need for interchangeable socket assemblies compatible with the headgear mount.

SUMMARY OF THE INVENTION

According to aspects of the present invention, a night vision goggle mount assembly is provided with a carriage to receive one of various interchangeable socket assemblies such that a socket assembly attached to the carriage can be positioned at any location along the carriage.

In one embodiment, a night vision goggle mount assembly is provided including a carriage having a base and at least one rail integral with and extending along the base, the at least one rail having a substantially constant cross-sectional shape along a length thereof. The night vision goggle mount assembly also includes a socket assembly having at least one channel configured to be attached to the at least one rail to permit sliding of the socket assembly along the at least one rail and a lock assembly for locking the socket assembly at any position along the at least one rail, wherein the lock assembly may lock the socket assembly by compression.

In one embodiment, there are two rails each having a generally T-shaped cross-section and two channels having a cross-section corresponding to a cross-section of the rails. Further, the night vision goggle mount assembly may further include a first stop for preventing the socket assembly from disengaging from the carriage. Additionally, the lock assembly may include a cam shaft rotatable to engage the lock assembly with the at least one rail.

DETAILED DESCRIPTION OF THE INVENTION

Figure 1:
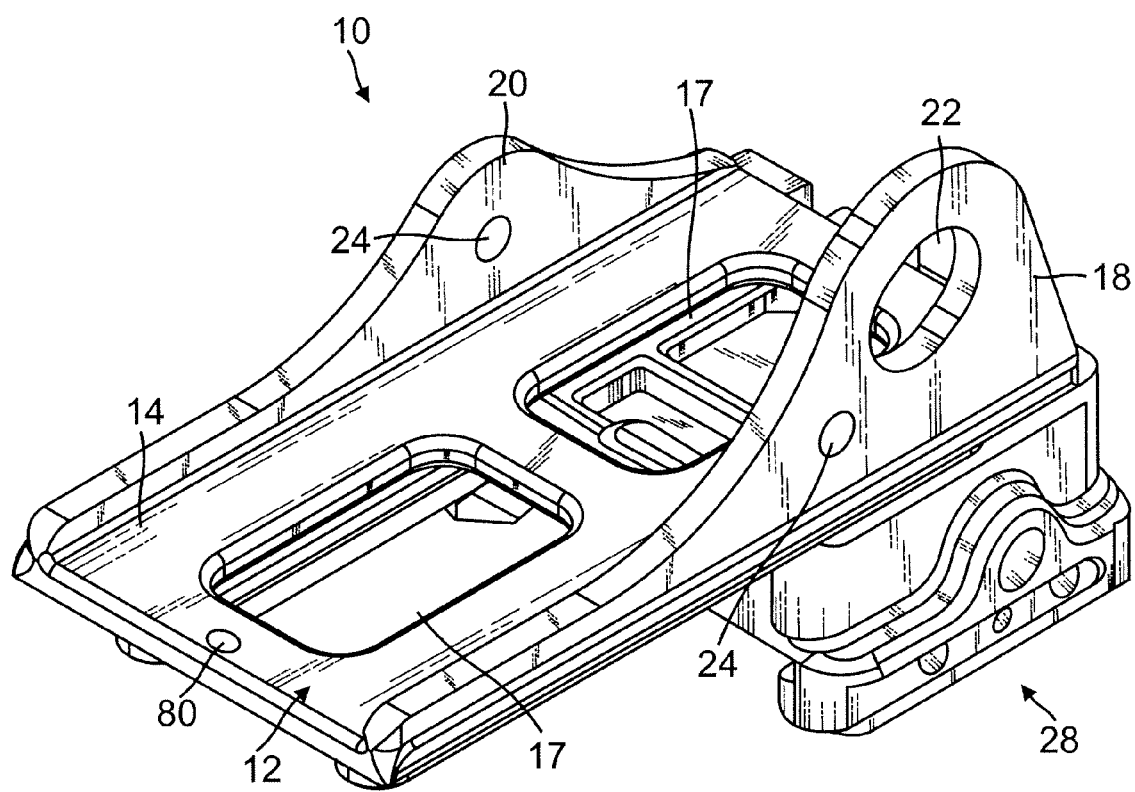
FIG. 1 is a top pictorial view of a carriage for a night vision goggle mount having a socket assembly mounted thereon in accordance with aspects of the present invention.

In the following detailed description, only certain embodiments of the present invention are shown and described, by way of illustration. As those skilled in the art will recognize, the invention may be embodied in many different forms and should not be construed as being limited to the embodiments set forth herein. Like reference numerals designate like elements throughout the specification.

In general, a carriage and socket assembly are provided as part of a night vision goggle mount assembly attachable to headgear. The carriage provides a structure to which the socket assembly is attachable and on which the socket assembly is slidable so that a user can position the socket assembly, and therefore night vision goggles attached to the socket assembly, at an infinite number of locations along the carriage to obtain a normal and comfortable eye relief distance between the user's eyes and the night vision goggles. Additionally, the carriage allows the user to readjust the night vision goggle socket assembly to a new position during operation of the goggles as well as switch between types of socket assemblies, such as dovetail socket assemblies, goggle horn socket assemblies and tip-in goggle assemblies.

A carriage 10 is provided with reference to FIG. 1, the carriage configured to be mounted to any suitable chassis of a night vision goggle mount, such as in U.S. Pat. No. 6,472,776 to Soto et al., the entire content of which is incorporated herein by reference. Generally, the carriage 10 provides a platform or base for the secure attachment of night vision goggles to the night vision goggle mount such that a user can operate the night vision goggles hands-free and stow the night vision goggles when they are not needed. A socket assembly 28 to which the night vision goggles are attachable may be slidably attached to the carriage thereby allowing fore/aft adjustment of the goggles by a user. That is, the night vision goggles can be adjusted to be closer to or farther from the eye or eyes of a user when the goggles are in a use position. Additionally, the socket assembly 28 may be removably attached to the carriage 10 to allow for interchangeability of different types of socket assemblies and/or night vision goggles with the carriage.

In one embodiment, the carriage 10 includes a base 12 having a top surface 14 facing a user's headgear and a bottom surface 16 facing an attached socket assembly. A pair of openings 17 generally centered on a central longitudinal axis of the base may be cut into the base to minimize the weight of the carriage without jeopardizing the structural integrity of the base. Additionally, first and second side walls 18, 20 extend along a lengthwise lateral edge of the top surface 14, each side wall having a sufficient attachment area to allow the carriage 10 to be attached to a night vision goggle mount chassis. In one embodiment, a top edge of the first and second side walls is generally bell-curved and may each include an attachment aperture 24 for receiving a fastener to attach the carriage to the chassis. Further, in one embodiment, the first side wall 18 may include a cam lever aperture 22 to receive a tilt cam lever for tilt adjustment of the carriage 10. One of ordinary skill in the art will appreciate that other suitable configurations for attaching the carriage to the night vision goggle mount chassis may also be used within the scope and spirit of the present invention.

Figure 2A:
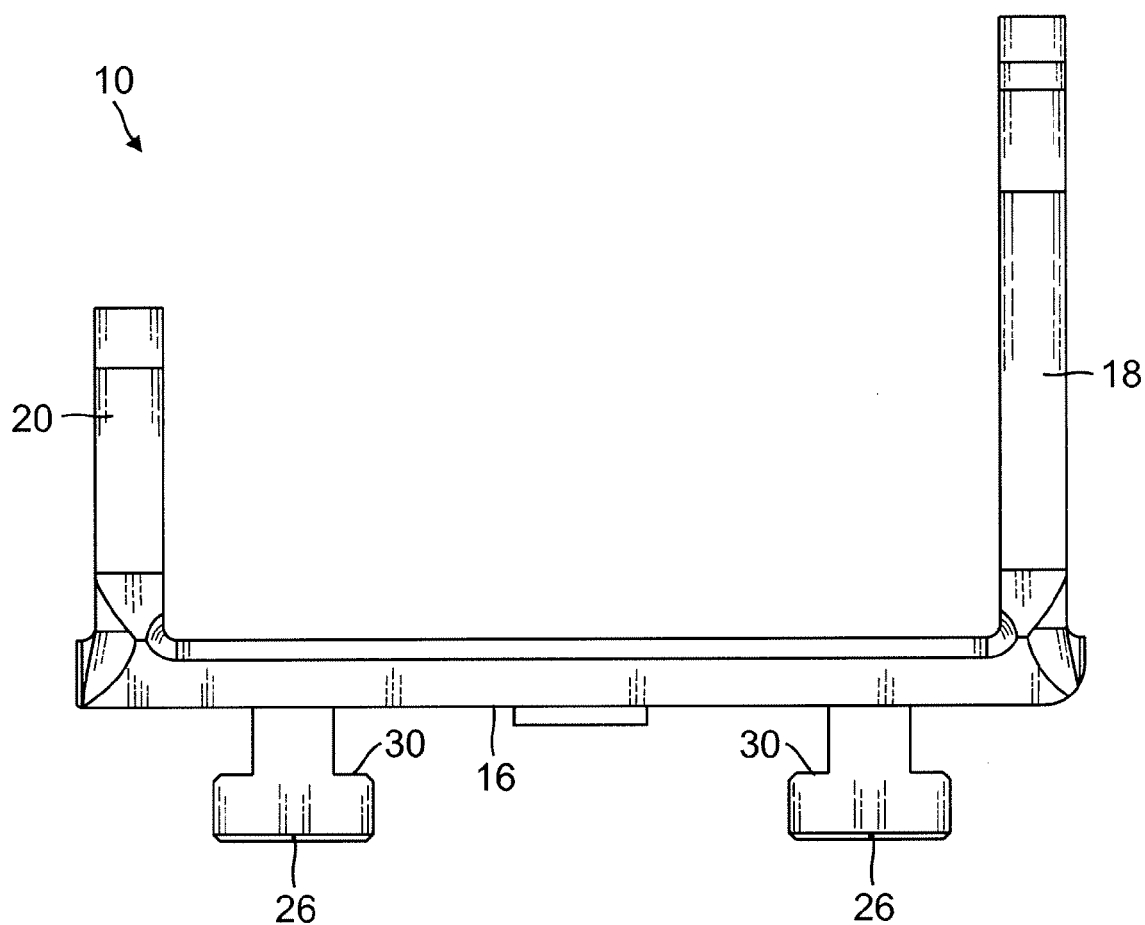
FIG. 2a is a front view of the carriage of FIG. 1.
Figure 2B:
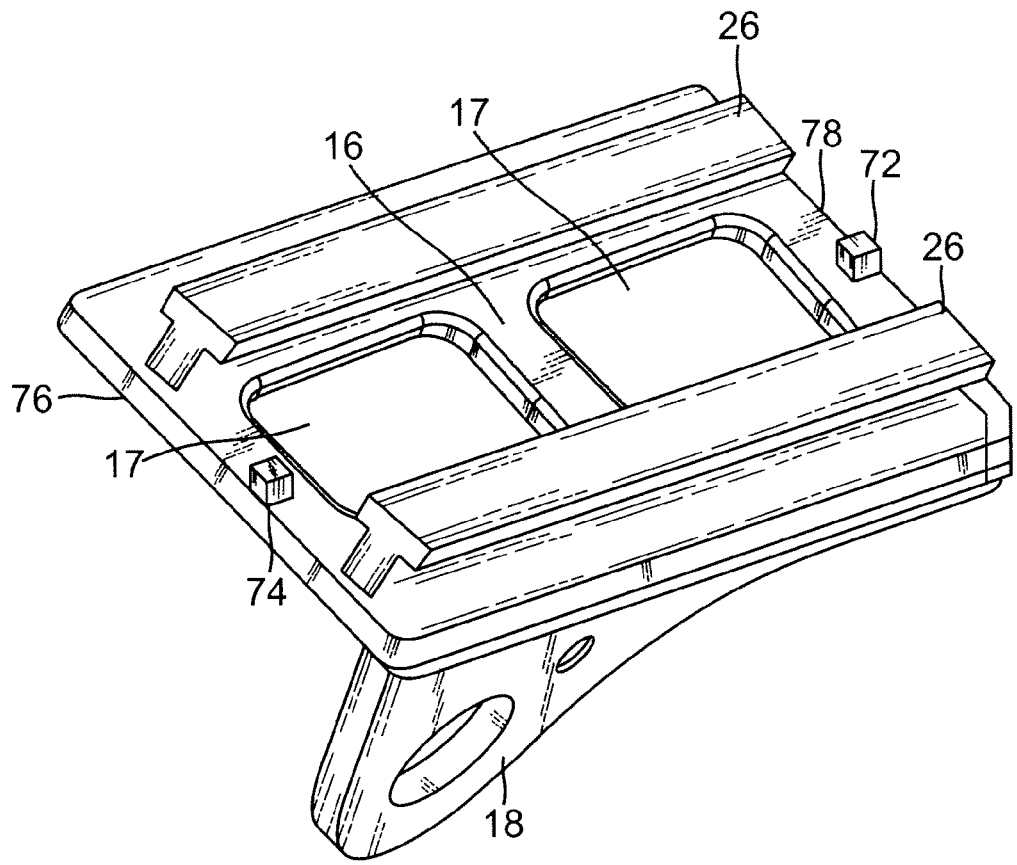
FIG. 2b is a bottom pictorial view of the carriage of FIG. 1.
Figure 3:
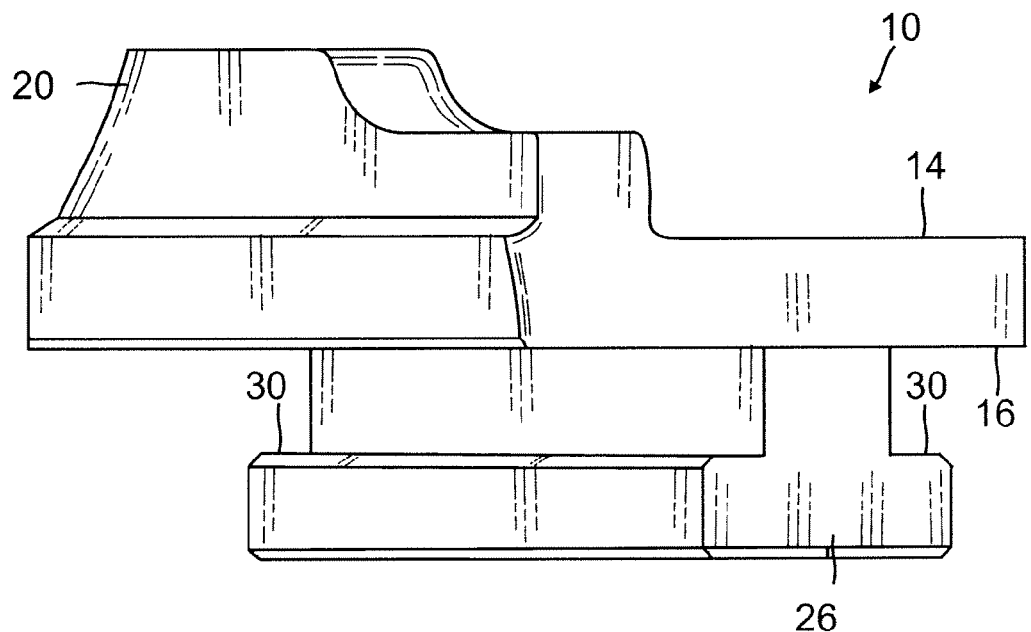
FIG. 3 is a pictorial detail view of a rail of the carriage of FIG. 1.

With reference now to FIGS. 2a, 2b and 3, the bottom surface 16 of the carriage 10 includes a pair of rails 26 configured to slidably receive the socket assembly 28, as described in more detail below. In general, the rails 26 are configured to allow for the attachment and securement of a socket assembly and to fix the socket assembly at any position along the rails. In one embodiment, the rails 26 have a T-shaped cross section to provide ledges 30 for abutting corresponding ledges 41 on channels 40 of the socket assembly 28 (FIG. 4) to maintain a sliding attachment between the socket assembly 28 and the carriage 10. In one embodiment, the rails 26 extend along substantially an entire length of the bottom surface 16 to allow maximum fore/aft movement of the socket assembly 28 attached to the rails. Additionally, the rails 26 may maintain substantially the same cross-section along their entire length to allow for infinite adjustment and smooth sliding of the socket assembly 28. Although a specific cross sectional shape of the rails 26 is described, one of ordinary skill in the art will appreciate that any suitable cross-sectional shape that allows the slidable attachment of a socket assembly may be used for the rails. Additionally, although two rails are shown and described, it will be appreciated that only one rail, or three or more rails, may be used and that the rails may extend along only a portion of the carriage 10.

As shown in FIG. 2b, the bottom surface 16 of the carriage 10 may further include a front stop 72 and a rear stop 74 for preventing the socket assembly 28 from accidentally disengaging from the carriage 10. The rear stop 74 protrudes from the bottom surface 16 proximate a rear edge 76 by a sufficient distance to engage the socket assembly 28 and to prevent the socket assembly from sliding off a rear of the carriage. Similarly, the front stop 72 protrudes from the bottom surface 16 proximate a front edge 78 by a sufficient distance to engage the socket assembly 28 and to prevent the socket assembly from sliding off a front of the carriage. In one embodiment, the front stop 72 is disengageable and/or movable such that it can be positioned to avoid interfering with insertion of the socket assembly 28 onto the carriage 10 or removal of the socket assembly from the carriage. For example, the front stop 72 may be a screw threaded into an aperture 80 (FIG. 1) that can be unscrewed to allow insertion of the socket assembly 28 and screwed in to act as a stop, or a button biased to protrude from the bottom surface 16 and able to be depressed upon insertion of the socket assembly. The rear stop 74 may be a permanent and/or unmovable stop or may be disengageable similar to the front stop 72.

In one embodiment, the carriage 10 is a single integral structure and may comprise any suitably rigid material, for example, cast, machined, or extruded aluminum. The integral structure of the carriage 10 allows it to be manufactured relatively inexpensively, yet have sufficient structural strength and rigidity for a secure attachment of night vision goggles. As will be appreciated, the carriage 10 may also comprise individual components attached together by, for example, fasteners.

Figure 4:
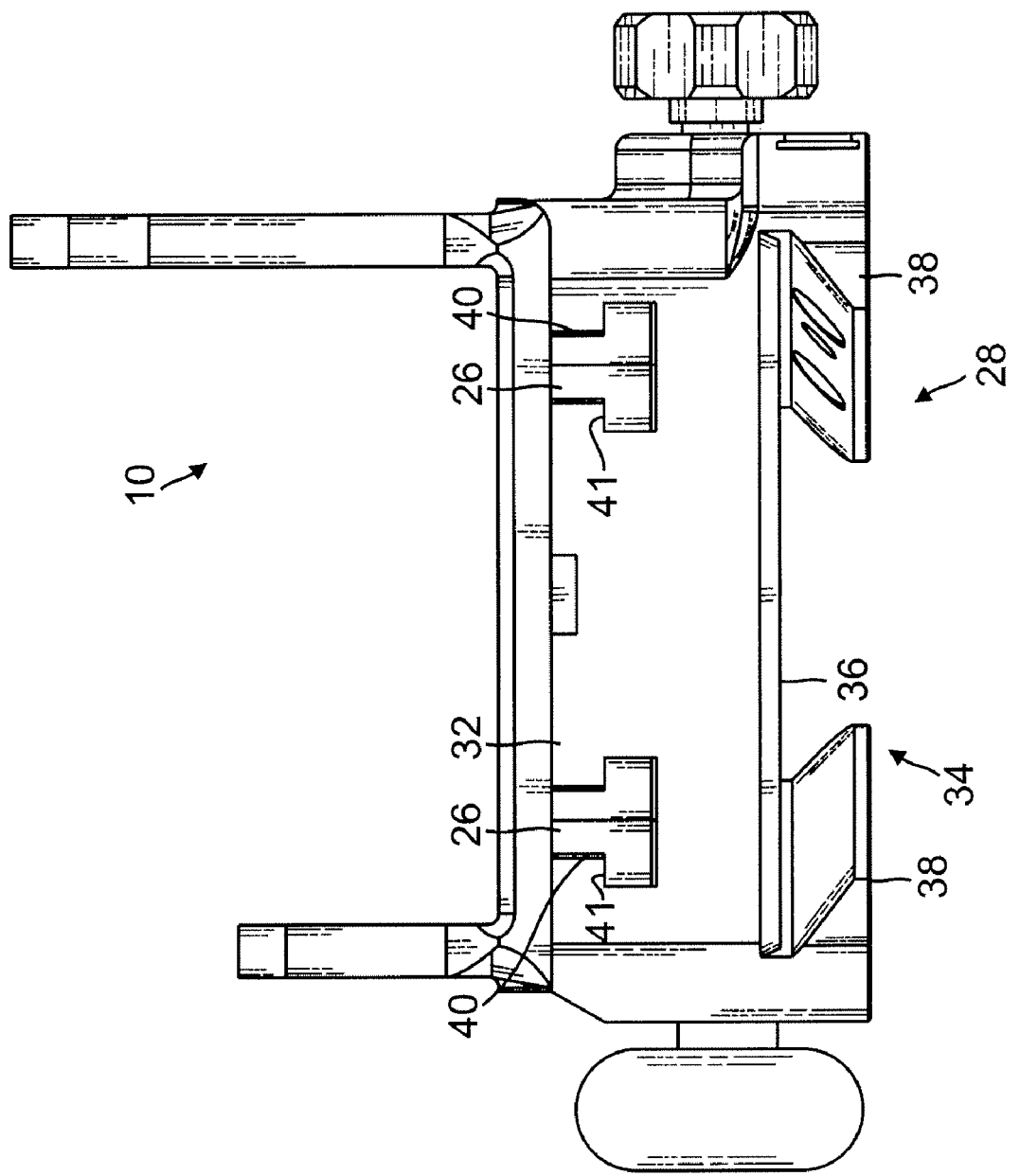
FIG. 4 is a front view of the carriage and the socket assembly attached to the carriage of FIG. 1.
Figure 5:
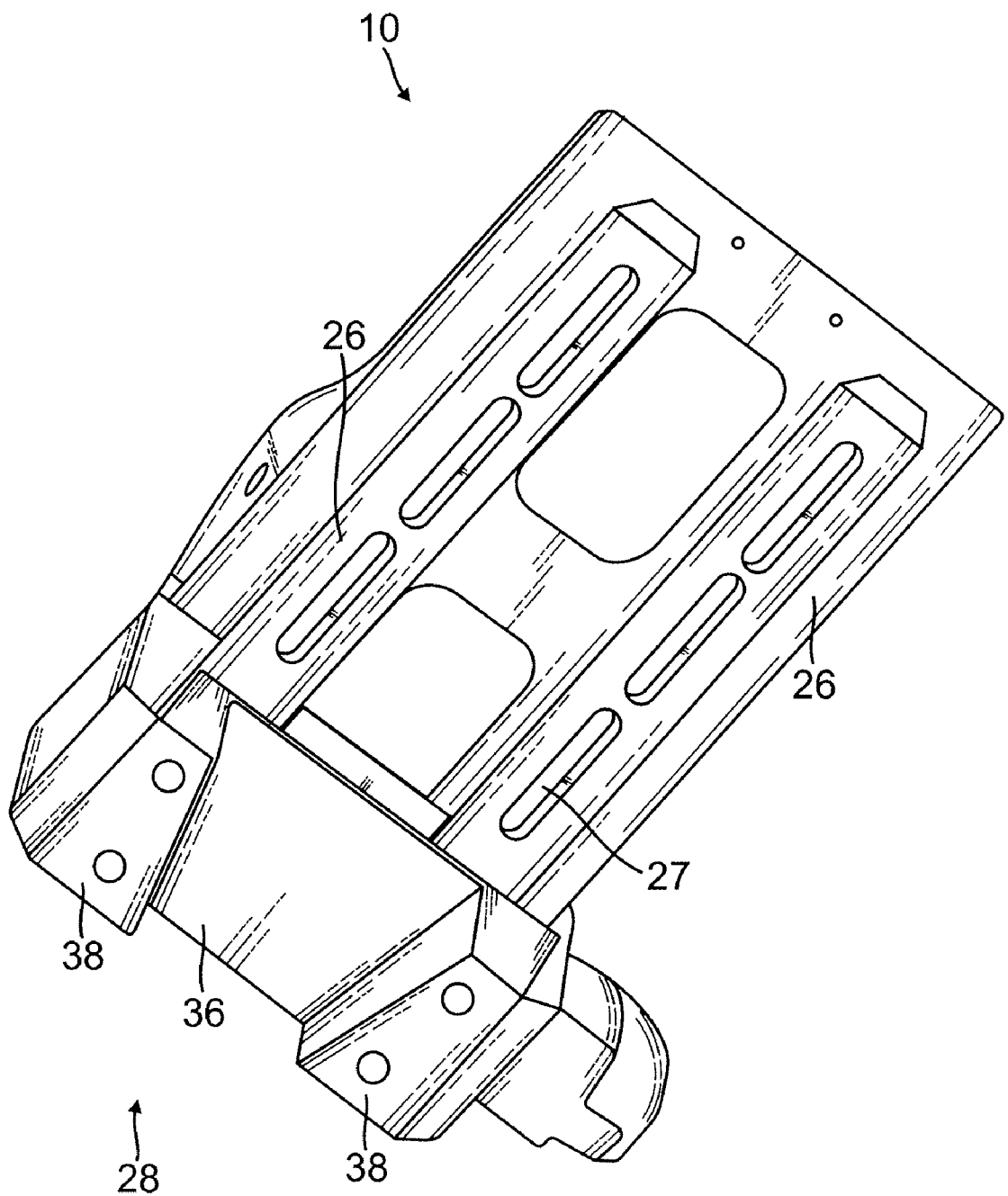
FIG. 5 is a bottom pictorial view of the carriage and the socket assembly attached to the carriage of FIG. 1.

The socket assembly 28 is described in more detail with reference to FIGS. 4-6. The socket assembly is configured to be slidably attached to the carriage 10 and includes a top surface 32 that slidingly abuts the bottom surface 16 of the carriage 10 and a bottom surface 34 adapted to receive night vision goggles. More specifically, the bottom surface 34 has a night vision goggle receiving area 36 into which a corresponding projection or attachment portion on the night vision goggles may be removably inserted. In one embodiment, the night vision goggle receiving area 36 is dovetail-shaped and includes a pair of opposite-facing rails 38 narrowingly tapering from a leading edge of the socket assembly to a trailing edge. The night vision goggle receiving area 36 is adapted to receive a dovetail shaped plate attached to night vision goggle to secure the night vision goggles to the socket assembly 28. However, one of ordinary skill in the art will appreciate that other night vision goggle receiving area configurations, such as a cavity for receiving a goggle horn or a tip-in assembly, may be incorporated into the socket assembly without departing from the spirit and scope of the present invention. With further reference to FIG. 5, the rails 26 may include cavities 27 that allow the weight of the rails to be minimized without compromising their structural integrity.

Figure 6:
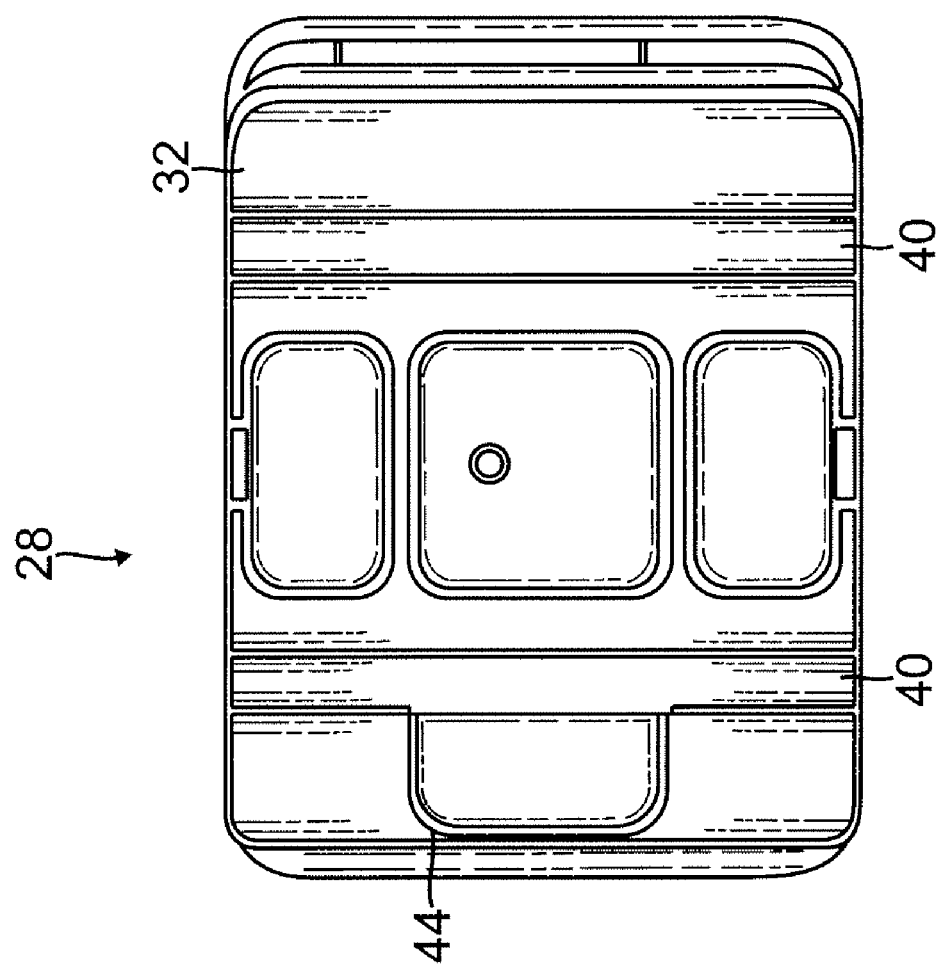
FIG. 6 is a top view of a socket assembly in accordance with aspects of the present invention.

With reference now to FIG. 6, the top surface 32 of the socket assembly 28 includes a pair of channels 40 adapted to be slidingly coupled to the rails 26 on the bottom surface 16 of the carriage 10. In one embodiment, the channels 40 are open-ended, extend along an entire length of the top surface 32, and generally define a T-shaped cross-section that substantially matches the T-shape of the rails 26. Ledges 41 (FIG. 4) created by the T-shaped cross-section of the channels 40 abut the ledges 30 defined by the T-shaped cross-section of the rails 26 upon insertion of the socket assembly 28 onto the carriage 10 to maintain a secure attachment between the socket assembly 28 and the carriage 10, yet to allow relative fore/aft sliding between the components along the rails. As will be appreciated, a cross-section of the channels 40 does not have to be substantially similar to a cross-section of the rails 26 as long as the channels allow fore/aft movement between the socket assembly 28 and the carriage 10, provide a secure attachment between the socket assembly and the carriage, and permit minimal vertical and horizontal movement between the components. Additionally, as noted above, other suitable cross-sectional shapes, for example, an L-shape or a C-shape, may be used for the rails 26 and/or channels 40.

Figure 7:
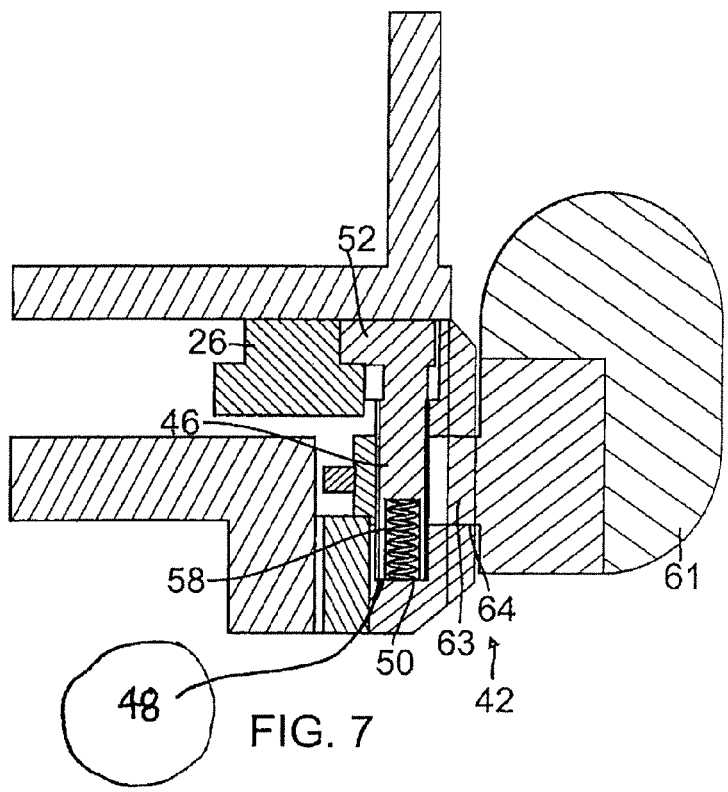
FIG. 7 is a cross-sectional view of a lock assembly on a socket assembly in accordance with aspects of the present invention.
Figure 8:
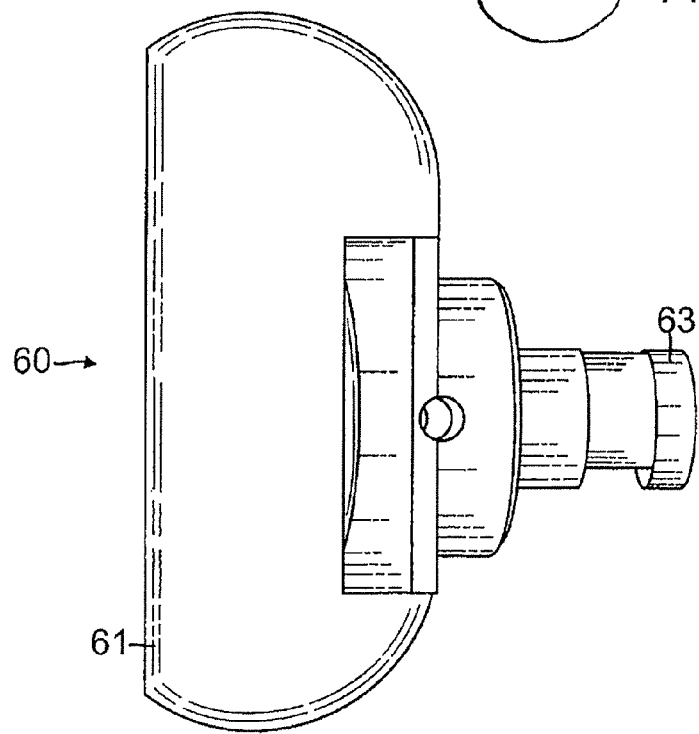
FIG. 8 is a detail side view of a lock lever in accordance with aspects of the present invention.
Figure 9:
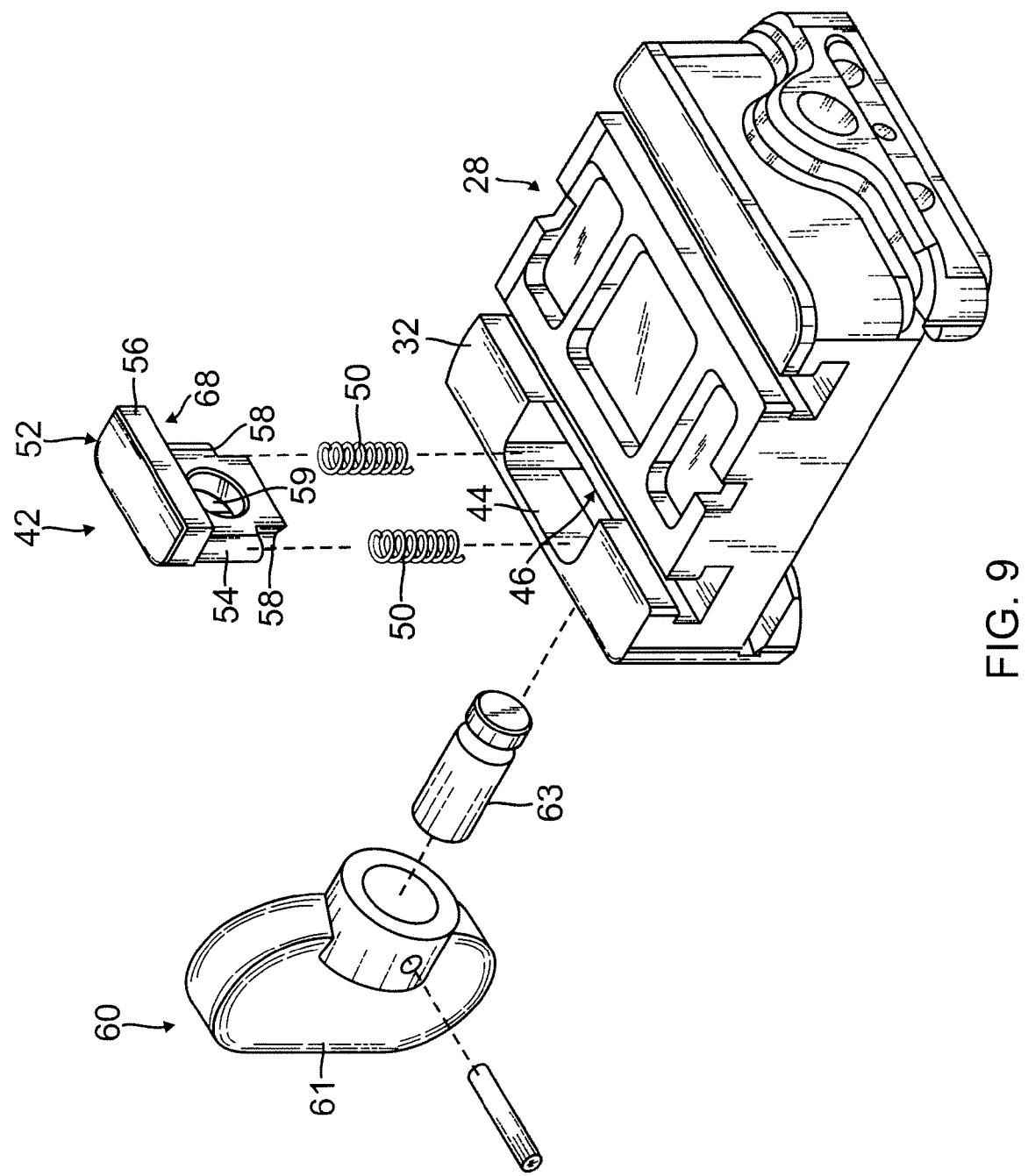
FIG. 9 is an exploded pictorial view of a socket assembly according to an embodiment of the present invention.

With reference now to FIGS. 7-9, a lock assembly 42 is provided on the socket assembly 28, the lock assembly movable between a locked position in which the lock assembly substantially prevents movement between the socket assembly 28 and the carriage 10, and an unlocked position in which the lock assembly permits the socket assembly to slide with respect to the carriage. As shown in FIG. 8, a lock lever 60 having a cam shaft 63 is provided to be rotated to move the lock assembly 42 between the locked and unlocked positions as described in more detail below.

As shown in FIG. 9, a recess 44 is located in the top surface 32 of the socket assembly 28 and extends to the ledge 41 of the channel 40. A cavity 46 extends toward the bottom surface 34 of the socket assembly 28 from the recess 44 and is configured to accommodate a lock 52. A pair of coil springs 50 are inserted into the cavity 46 resting on a cavity surface 48 (FIG. 7) and extending along walls of the cavity to bias the lock 52 inserted into the cavity into the unlocked position, as described in more detail below.

The lock 52 is insertable into the cavity 46 and can be accommodated within the recess 44. The lock 52 includes a base 54 and a locking shoulder 56 extending from the base, the locking shoulder capable of applying compression to the rail 26 of the carriage 10 when in the locked position to prevent movement between the socket assembly 28 and the carriage. The base 54 is configured to be inserted into the cavity 46 and has a pair of coil shoulders 58, each coil shoulder abutting an end of a coil spring 50 when the lock 52 is inserted to the cavity 46. Accordingly, the coil springs 50 bias the lock 52 toward the top surface 32 of the socket assembly 28. A through hole 59 extends laterally through the base 54 and receives the lock lever 60, as described in more detail below.

The locking shoulder 56 extends laterally from the base 54 to create a shelf such that when the lock 52 is inserted into the cavity 46 the locking shoulder 56 generally occupies the recess 44, thereby acting as a vertically movable rail section and overlapping a rail 26 when the carriage 10 is combined with the socket assembly 28 (FIG. 7).

As shown in FIG. 8, the lock lever 60 includes a handle 61 and a cam shaft 63 extending therefrom, the cam shaft insertable into a through hole 64 in a side surface of the socket assembly and into the through hole 59 in the base 54 of the lock 52 to place the lock lever in contact with the lock. The cam shaft 63 may be a separate component fixed to the handle 61 or the cam shaft and handle may be a single integral piece. Rotation of the handle 61 results in direct rotation of the cam shaft in contact with the lock 52, thereby moving the lock 52 vertically between the locked position and the unlocked position. As one of ordinary skill in the art will appreciate, the configuration of the coil springs 50 and the cam shaft 63 could be rearranged such that the coil springs bias the lock 52 into the locked position and the cam shaft is used to bias the lock into the unlocked position. Additionally, it will be appreciated that the coil springs could bias the lock 52 in an opposite direction without departing from the spirit and scope of the present invention.

An operation of the carriage 10 and socket assembly 28 will now be described. The socket assembly 28 having night vision goggles attached thereto may be slid onto the carriage 10 by engaging the channels 40 with the rails 26. If necessary, the front stop 72 or the rear stop 74 may be removed or repositioned to allow the attachment of the socket assembly 28 to the carriage 10, and then replaced or repositioned to temporarily prevent the disengagement of the socket assembly from the carriage. Once the socket assembly 28 is engaged, a user can slide the socket assembly along the rails 26 such that the night vision goggles attached to the socket assembly are at a desired eye relief distance, and then lock the socket assembly 42 in place by moving the lock assembly from the unlocked to the locked position as described below. If a user wants to change the eye relief distance, the user can unlock the lock assembly 42, slide the socket assembly 28 along the rails 26, and relock the lock assembly. If a user wants to use a different socket assembly, the user can remove or reposition the first or second stop, remove the first socket assembly and replace it with a second socket assembly.

An operation of the lock assembly will now be described. As noted above, the lock 52 is inserted into the cavity 46, thereby locating the locking shoulder 56 within the recess 44. The coil shoulders 58 of the base 54 abut the coil springs 50 that bias the lock 52 toward the surface 32 of the socket assembly 28 into the unlocked position. The cam shaft 63 is inserted through the through holes 64, 59 in the socket assembly 28 and the lock 52, respectively, such that the cam shaft abuts an inner circumferential surface of the through hole 59 in the lock 52. Due to the interaction between the cam shaft 63 and the lock 52, rotation of the lock lever 60 results in vertical movement of the lock between the locked position and the unlocked position.

In the unlocked position, an engaging surface 68 of the locking shoulder 56 is generally aligned with or slightly recessed from the ledge 41 of the channel 40, thereby allowing the socket assembly 28 to slide freely along the rails 26 of the carriage. Additionally, since the rails are smooth, the carriage provides for infinite fore/aft adjustment of the socket assembly without wobble.

Rotation of the lock lever 60 moves the lock 52 from the unlocked position into the locked position in which the cam shaft 63 biases the locking shoulder 56 toward the bottom surface 34 of the socket assembly 28 and against the rail 26, thereby preventing movement of the socket assembly relative to the carriage 10. In one embodiment, the lock assembly may be configured such that placement of the handle 61 in a generally vertical direction places the lock assembly 42 in the unlocked position, and rotation of the handle in either direction away from the vertical direction places the lock assembly in the locked position. One of ordinary skill in the art will appreciate that other configurations of the handle 61 relative to the cam shaft 63 may be used without departing from the spirit and scope of aspects of the present invention.

Figure 10:
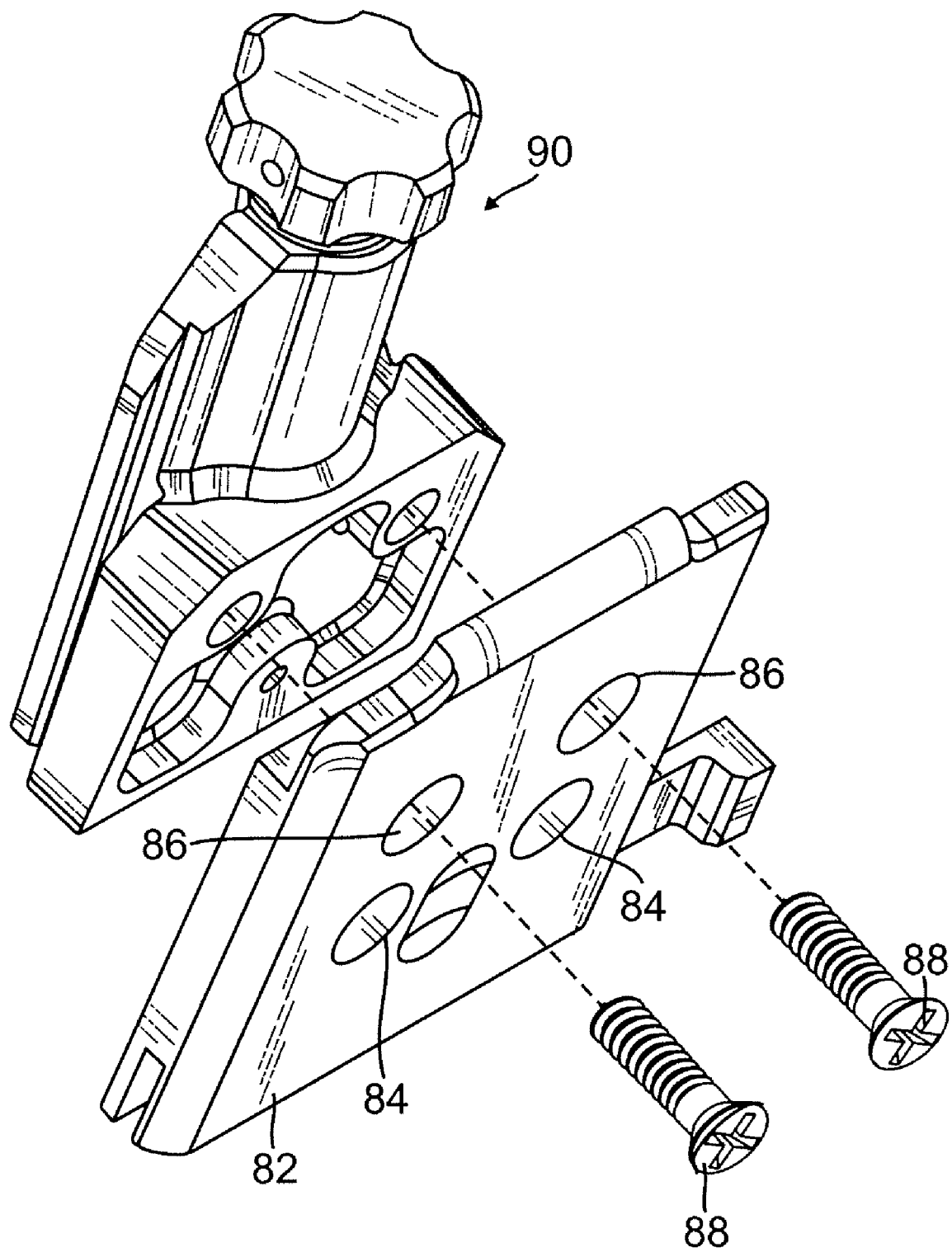
FIG. 10 is an exploded rear view of a back plate for attaching a night vision goggle mount to headgear in accordance with aspects of the present invention.

With reference now to FIG. 10, a back plate 82 is provided in accordance with aspects of the present invention, the back plate adapted to attach to, for example, a shroud plate mounted on headgear such as the shroud plate described in U.S. Pat. No. 6,928,736 to Prendergast, the entire content of which is incorporated herein by reference. The back plate 82 is attachable by fasteners 88 to a rear surface of a night vision goggle mount 90, thereby serving to attach the night vision goggle mount to the head gear.

As noted above, the carriage 10 according to embodiments of the present invention is adapted to receive various socket assemblies 28 based on the connection type on a pair of night vision goggles. For example, the socket assembly may be adapted to receive a dovetail plate or a goggle horn, among others. However, due to the nature of particular attachment mechanisms, the eye pieces of night vision goggles attached to different socket assemblies may be located at varying heights. Accordingly, the back plate 82 is configured to accommodate varying night vision goggle heights to allow eyepieces on night vision goggles to be placed relatively close to a user's eye level without the user needing to make a large vertical adjustment. More specifically, the back plate 82 has first and second attachment hole sets 84, 86 vertically spaced from each other such that fasteners 88 can be inserted into the appropriate attachment hole set based on the socket assembly. Although only two attachment hole sets 84, 86 are shown, one of ordinary skill in the art will appreciate that more attachment hole sets may be used, and that the attachment hole sets may be spaced relatively closer or farther apart to accommodate a variety of socket assemblies or that the attachment holes may be slots allowing for vertical adjustment.

While the present invention has been described in connection with certain embodiments, it is to be understood that the invention is not limited to the disclosed embodiments, but rather is intended to cover various modifications and equivalent arrangements included within the spirit and scope of the appended claims, and equivalents thereof.

What is claimed is:

1. A night vision goggle mount assembly comprising:
a carriage comprising:
   a base having opposing side walls each having an aperture configured to accommodate a fastener; and
   at least one rail integral with and extending along the base, the at least one rail having a substantially constant cross-sectional shape along a length thereof; and
a socket assembly configured to be coupled to a mount for night vision goggles, the socket assembly comprising at least one channel configured to be attached to the at least one rail of the carriage to permit sliding of the socket assembly along the at least one rail and a lock assembly for locking the socket assembly in a locked position by compression at any position along the at least one rail, wherein the lock assembly contacts the at least one rail in the locked position.

2. The night vision goggle mount assembly of claim 1, wherein the at least one rail has a generally T-shaped cross-section.

3. The night vision goggle mount assembly of claim 1, further comprising a first stop for preventing the socket assembly from disengaging from the carriage.

4. The night vision goggle mount assembly of claim 1, wherein the carriage comprises two rails and the socket assembly comprises two channels.

5. The night vision goggle mount assembly of claim 1, wherein a cross-section of the at least one channel substantially corresponds to a cross-section of the at least one rail.

6. The night vision goggle mount assembly of claim 1, wherein the lock assembly comprises a cam shaft rotatable to place the lock assembly in contact with the at least one rail.

7. A carriage and socket assembly for a headgear mount comprising a carriage and a socket assembly, the carriage comprising:
   a base configured to be attached to the headgear mount such that the base is rotatable with respect to the headgear mount; and
   at least one rail integral with and extending along the base, the at least one rail having a substantially constant width along an entire length of the at least one rail and configured to receive the socket assembly and to position the socket assembly at any position along the at least one rail; and
the socket assembly comprising:
   a lock assembly comprising a lock adapted to contact the at least one rail to lock the socket assembly at any position along the at least one rail,
   wherein the lock has a shoulder having a substantially planar surface that abuts the at least one rail to lock the socket assembly to the carriage.

8. The carriage and socket assembly of claim 7, wherein the at least one rail has a substantially identical cross-section along a length of the at least one rail.

9. The carriage and socket assembly of claim 7, wherein the at least one rail is configured to slidably receive the socket assembly.

10. The carriage and socket assembly of claim 7, wherein the at least one rail has a generally T-shaped cross-section.

11. The carriage and socket assembly of claim 7, wherein the at least one rail has a ledge onto which the socket assembly is attachable.

12. The carriage and socket assembly of claim 7, further comprising a first stop for preventing an attached night vision goggle assembly from disengaging from the carriage.

13. The carriage and socket assembly of claim 12, wherein the first stop is positionable to avoid interfering with attachment of the socket assembly onto the at least one rail.

14. The carriage and socket assembly of claim 12, further comprising a second stop for preventing an attached night vision goggle assembly from disengaging from the carriage.

15. The carriage and socket assembly of claim 7, wherein the base comprises first and second side walls configured to attach the carriage to the headgear mount.

16. The carriage and socket assembly of claim 7, wherein the carriage is a single integral structure.

17. The carriage and socket assembly of claim 7, wherein the lock assembly further comprises a lock lever coupled to the lock by a shaft, wherein rotation of the lock lever causes the lock to move proximally towards or distally from the at least one rail.

18. The carriage and socket assembly of claim 7, wherein the shaft is a cam shaft.

* * * * *

UNITED STATES PATENT AND TRADEMARK OFFICE
CERTIFICATE OF CORRECTION

PATENT NO.         : 8,239,971 B2                                         Page 1 of 1
APPLICATION NO.    : 12/398864
DATED              : August 14, 2012
INVENTOR(S)        : Jonathon R. Prendergast It is certified that error appears in the above-identified patent and that said Letters Patent is hereby corrected as shown below:

In the Claims

Column 8, line 40, Claim 18          Delete "claim 7,",

Insert -- claim 17, --

Signed and Sealed this
Third Day of June, 2014

Michelle K. Lee
*Deputy Director of the United States Patent and Trademark Office*